(12) United States Patent
Griggs et al.

(10) Patent No.: US 10,124,814 B2
(45) Date of Patent: Nov. 13, 2018

(54) PASSENGER CABIN OF A VEHICLE AND A METHOD OF MANUFACTURING A PASSENGER CABIN

(71) Applicant: Bombardier Transportation GmbH, Berlin (DE)

(72) Inventors: Paul Griggs, Derbyshire (GB); Richard Butterfield, Derbyshire (GB)

(73) Assignee: Bombardier Transportation GmbH, Berlin (DE)

( * ) Notice: Subject to any disclaimer, the term of this patent is extended or adjusted under 35 U.S.C. 154(b) by 211 days.

(21) Appl. No.: 15/022,428

(22) PCT Filed: Sep. 17, 2014

(86) PCT No.: PCT/EP2014/069767
§ 371 (c)(1),
(2) Date: Mar. 16, 2016

(87) PCT Pub. No.: WO2015/040044
PCT Pub. Date: Mar. 26, 2015

(65) Prior Publication Data
US 2016/0229423 A1 Aug. 11, 2016

(30) Foreign Application Priority Data
Sep. 18, 2013 (EP) .................................. 13185011

(51) Int. Cl.
| B61D 1/04 | (2006.01) |
| B60N 3/02 | (2006.01) |
| B61D 33/00 | (2006.01) |
| B60N 2/24 | (2006.01) |

(52) U.S. Cl.
CPC ................. *B61D 1/04* (2013.01); *B60N 3/02* (2013.01); *B61D 33/0007* (2013.01); *B61D 33/0064* (2013.01); *B60N 2002/247* (2013.01)

(58) Field of Classification Search
CPC .. B61D 1/04; B61D 33/0007; B61D 33/0057; B61D 33/0064; B61D 33/0078; B61D 33/0085; B60N 2002/247
See application file for complete search history.

(56) References Cited

U.S. PATENT DOCUMENTS 761,737 A * 6/1904 Wellman .................. B61D 1/04
                                                    105/344
889,613 A * 6/1908 Jaeger ...................... B61D 1/04
                                                    105/344
(Continued)

FOREIGN PATENT DOCUMENTS

| EP | 1127788 A1 | 8/2001 |
| JP | 636447 U | 5/1994 |
(Continued)

*Primary Examiner* — Zachary L Kuhfuss
(74) *Attorney, Agent, or Firm* — The Webb Law Firm

(57) ABSTRACT

The invention relates to a passenger cabin of a vehicle, in particular a saloon coach of a rail vehicle, wherein the passenger cabin (1) comprises a room divider (10), wherein the room divider (10) is attached to a cabin frame, wherein the room divider (10) comprises at least one backrest surface (11, 12), wherein at least a section of the backrest surface (11, 12) extends along a longitudinal axis (3) of the passenger cabin (1).

14 Claims, 2 Drawing Sheets

(56) References Cited

U.S. PATENT DOCUMENTS

| | | | | |
|---|---|---|---|---|
| 2,557,885 A | * | 6/1951 | Murphy | B61D 1/04 |
| | | | | 105/344 |
| 3,349,723 A | | 10/1967 | Guin | |
| 6,467,728 B2 | | 10/2002 | Angerami et al. | |
| 2012/0062175 A1 | * | 3/2012 | Miller | H02J 7/025 |
| | | | | 320/108 |
| 2013/0313365 A1 | * | 11/2013 | Ehlers | B64D 11/06 |
| | | | | 244/118.6 |
| 2015/0360704 A1 | * | 12/2015 | Buchholz-Stieglitz | |
| | | | | B61D 1/04 |
| | | | | 105/345 |
| 2016/0159372 A1 | * | 6/2016 | Fray | B61D 1/06 |
| | | | | 105/340 |

FOREIGN PATENT DOCUMENTS

| | | |
|---|---|---|
| JP | 201211962 A | 1/2012 |
| KR | 1020040032703 A | 4/2004 |

\* cited by examiner

PASSENGER CABIN OF A VEHICLE AND A METHOD OF MANUFACTURING A PASSENGER CABIN

CROSS-REFERENCE TO RELATED APPLICATIONS

This application is the United States national phase of International Application No. PCT/EP2014/069767 filed Sep. 17, 2014, and claims priority to European Patent Application No. 13185011.7 filed Sep. 18, 2013, the disclosures of which are hereby incorporated in their entirety by reference.

BACKGROUND OF THE INVENTION

Field of the Invention

The invention relates to a passenger cabin of a vehicle, in particular a saloon coach of a rail vehicle, and a method of manufacturing such a passenger cabin.

Description of Related Art

On large, high capacity vehicles with longitudinal seating exists a large standee area in the center of the passenger cabin where the passengers have little support and can be squashed against each other in peak times.

Usually, there are vertical grab poles and grab rails, e.g. with strap handles, in the center of the passenger cabin to provide support.

The U.S. Pat. No. 6,467,728 B2 discloses a passenger aircraft comprising a passenger cabin structure, a standing room area in said passenger cabin structure, at least one passenger stand mounted to said cabin structure in said standing room area having a standing clearance accommodating said at least one passenger stand in which a passenger retains an upright standing position during starting, during flight and during landing of said passenger aircraft in the gravity field of the earth. The passenger stand comprises a passenger upright backing for taking up accelerations to which an upright standing passenger in said passenger stand is exposed during said starting, flight and landing of said passenger aircraft in said gravity field. Further, a safety device secured to said passenger stand for holding an upright standing passenger in said passenger stand in an upright passenger position during said starting, flight and landing of said passenger aircraft in said gravity field is described, whereby a gravity gradient is effectively substantially extending from head to toe of a passenger. The document describes a passenger stand wherein the passenger upright backing faces in the forward direction of the aircraft. Only in this way, the said accelerations can be taken up.

SUMMARY OF THE INVENTION

It is an object of the present invention to provide a passenger cabin, in particular a saloon of a rail vehicle, and a method of manufacturing a passenger cabin, wherein a travel comfort for passengers travelling in the passenger cabin is improved.

It is a basic idea of the invention to provide a longitudinal room divider which divides a passenger cabin or saloon of a vehicle lengthwise. In particular, a standing room or standee area of the passenger cabin is divided lengthwise.

A passenger cabin of a vehicle, in particular a vehicle for passenger transport, is proposed. More particular, a passenger cabin or saloon coach of a rail vehicle is proposed. The passenger cabin comprises a standing room or standee area for transporting standing passengers.

The passenger cabin comprises a room divider, in particular a room divider for the aforementioned standing room of the passenger cabin. The room divider is attached to a cabin frame. Preferably, the room divider can be attached to a floor section of the cabin frame. Alternatively, the room divider can be attached to a ceiling section of the cabin frame. More preferably, the room divider can be attached to the floor and to the ceiling section of the cabin frame. In particular, the room divider can be mechanically fixed to the cabin frame, e.g. by the means of a detachable or non-detachable mechanical connection.

The cabin frame encloses an inner volume which provides the passenger cabin and also the aforementioned standing room. Within the passenger cabin, there is a clearance between the floor and the ceiling of the passenger cabin.

The room divider comprises or provides at least one backrest surface. The backrest surface can also be described as a lean-to surface. The backrest surface is designed and/or arranged such that at least one passenger can lean his/her back against the backrest surface.

In the context of this invention, the following coordinate system will be referred to. A longitudinal direction is defined as a direction of a longitudinal axis of the passenger cabin or the vehicle comprising said passenger cabin. The longitudinal axis can be a central longitudinal axis. It is possible that the longitudinal direction is parallel to a direction of travel of the vehicle if the vehicle travels straight forward. A vertical direction is defined as a direction of a vertical axis which is oriented from the floor of the passenger cabin to the ceiling of the passenger cabin. Moreover, the vertical direction is oriented perpendicular to the aforementioned longitudinal direction. A lateral direction is defined as a direction of a lateral axis of the passenger cabin. The lateral axis is oriented perpendicular to the aforementioned longitudinal and vertical axis. All axes form a right-handed coordinate system. An origin of a coordinate system can be located in a plane comprising or providing the floor of the passenger cabin with respect to the vertical direction. With respect to the longitudinal and lateral direction, the origin can be located at a center of the passenger cabin.

With respect to the previously described origin of the coordinate system, the backrest surface can have a predetermined length with respect to the longitudinal direction, and a predetermined height with respect to the vertical direction. A lower end, e.g. a lower edge or border, of the backrest surface can be spaced apart from the origin or floor with a predetermined vertical distance. Said predetermined vertical distance can be chosen such that a passenger of a standard height can lean his back against the backrest surface. For example, a predetermined vertical distance can be chosen from an interval of 0.7 m to 1.1 m. It is, of course, possible that the vertical distance can take lower or higher values. In particular, the vertical distance can be chosen depending on an average size of the population.

According to the invention, at least a section of the backrest surface extends along the longitudinal axis of the passenger cabin. This means that a normal vector of the at least one section of the backrest surface is oriented transverse to the longitudinal axis of the vehicle. In this context, "transverse" means that the longitudinal axis and the normal vector can enclose a predetermined angle. Said predetermined angle can be chosen from an interval from −45 degree to 45 degree. This angle can be measured in a common projection plane which can e.g. correspond to the plane defined by the aforementioned longitudinal and lateral axis.

Preferably, the normal vector of the at least one section of the backrest surface is oriented perpendicular to the longitudinal axis of the vehicle. In this case, the normal vector of the at least one section or of the whole backrest surface encloses an angle of 90 degree with the aforementioned longitudinal axis.

More preferably, the (complete) backrest surface is arranged in a plane or is formed as a plane surface, wherein the normal vector of the plane is oriented perpendicular to the longitudinal axis, i.e. is parallel to the lateral axis. In this case, the complete backrest surface extends along the longitudinal axis of the passenger cabin.

The room divider can have a predetermined length, wherein the length can be defined as the maximal dimension of the room divider along the longitudinal axis. Also, the room divider can have a predetermined width, wherein the width can be a maximal dimension along the lateral axis. Furthermore, the room divider can have a predetermined height, wherein the height can be a maximal dimension along the vertical axis. In this case, the length of the room divider can be larger than the width of the room divider.

The backrest surface can be a part of a longitudinal sidewall of the room divider or provide a longitudinal side wall of the room divider. In this context, a longitudinal sidewall denotes a sidewall of the room divider which faces into the lateral direction.

A length of the room divider or a length of the backrest surface can be chosen such that at least one passenger can lean his/her back against the backrest surface. Preferably, the length can be chosen higher than 0.4 m. It is, of course, possible that the length can take lower or higher values. In particular, the length can be chosen such that a support for at least one standee is provided.

Within the proposed passenger cabin, the room divider divides the passenger cabin, in particular the standing room of the passenger cabin, lengthwise. By said room divider, the mass of passengers arranged in the standing room can be physically split. Also, the room divider advantageously provides a mechanical support to the standing passengers during travelling.

By splitting the mass of passengers and by providing an additional support, a travel comfort for passengers in the proposed passenger cabin can be increased. By arranging the room divider in a longitudinal direction, a passenger flow in or against the longitudinal direction, e.g. during an entry or exit action, is not or only minimally constrained.

In particular, the room divider can be designed such that a portion of the backrest surface is arranged at or above a predetermined height along the vertical direction, e.g. at a height of at least 1.8 m. This means that a maximal height of the room divider is higher than the predetermined height. In this case, the room divider prevents from head strikes from passengers arranged on opposite longitudinal sides of the room divider.

Providing such a longitudinal room divider also advantageously allows minimizing the impact of the room divider on the coverage of a camera-based observation of the cabin. Such a camera-based observation can e.g. be a part of a closed circuit television (CCTV) system which is used to observe the cabin.

In another embodiment, the room divider is centered in the passenger cabin. In this context, "centered" means that the distances of a backrest surfaces to the respective facing side wall of the passenger cabin are equal or nearly equal. For example, the distance of a first, e.g. a right, backrest surface of the room divider to a first, e.g. a right, sidewall of the passenger cabin is equal to the distance of another, e.g. a left, backrest surface of the room divider to another, e.g. a left, sidewall of the passenger cabin. In this case, the other backrest surface of the room divider is arranged at an opposite longitudinal side of the room divider as the first backrest surface.

This advantageously minimizes disturbances or constraints on passenger flow in or against the longitudinal direction through the passenger cabin, in particular during exit and entry processes.

In another embodiment, a length of the room divider or the backrest surface along the longitudinal axis is chosen such that more than one passenger can lean against the backrest surface. Preferably, the length can be chosen higher than 0.8 m. It is, of course, possible that the length can take lower or higher values. In particular, the length can be chosen such that a support for two standees is provided.

In this case, the proposed room divider advantageously provides support for more than one standing passenger.

In another embodiment, the room divider comprises at least one stand, wherein the stand is attached to the floor of the passenger cabin. A portion of the room divider which provides the aforementioned backrest surface can be attached to the stand. The stand can have a predetermined height, e.g. a height of 0.1 m to 0.7 m. With respect to the vertical direction, the backrest portion of the room divider is arranged above the stand.

It is also possible that the room divider comprises more than one stand, in particular two stands.

This advantageously allows a reliable and safe attachment of the room divider to the cabin frame, in particular to the floor of the cabin.

In another embodiment, the room divider comprises a handhold. The handhold can e.g. be designed as a hand rail, a hand bar or a strap handle.

If the handhold is designed as a hand rail or hand bar, the handhold can be a closed or an opened handhold. An opened handhold in this context means that the both ends of the handhold are attached to the room divider. In the case of an opened handhold, only one hand of the handhold is attached to the room divider. Preferably, the handhold is arranged at a front end or a rear end of the room divider, in particular at a front end wall and a rear end wall. In this context, the terms "front" and "rear" refer to the aforementioned longitudinal direction.

In another embodiment, the room divider comprises a display. The display can be a simple static display for displaying a route map or advertisement. Alternatively, the display can be a life digital display, wherein real time updates can be displayed via the display. It is possible to use either a TFT screen or at least one OLED panel. Preferably, the display is arranged at an upper end of the backrest surface, i.e. in a top or upper portion of the backrest surface.

This advantageously allows integrating information displaying means within the room divider. Arranging the display at the upper end of the backrest surface improves an observability of the information displayed by the display. Means for power and data supply for the display, e.g. a power source and/or power cables and data cables, can be arranged within an inner volume of the room divider enclosed by the aforementioned sidewalls of the room divider. It is, for instance, possible to guide the aforementioned cables through the stand, e.g. through a guiding channel provided by the stand, into the inner volume of the room divider and connect them to the display.

In another embodiment, the room divider comprises or forms at least one support surface, wherein the support is oriented parallel to a floor surface of a cabin. This means that a normal vector of the support surface is oriented parallel to the vertical axis. In other words, the support surface faces upwards. The support surface can have predetermined dimensions, in particular dimensions which are equal or larger than standard dimensions of a mobile device such as a tablet or a mobile phone. The support surface can be used to place personal objects of the passengers, in particular the aforementioned mobile devices. The at least one support surface can be provided by a bearing-out element, a cantilever element or a corbel element provided by the room divider.

The support surface can be arranged at a predetermined height with respect to the previously described coordinate system. The height should be chosen such that a standing passenger can easily place and grab an object on/from the support surface. The predetermined height can e.g. be chosen from an interval from 0.7 m to 1.5 m. It is, of course, possible that the height can take lower or higher values.

This advantageously increases a travel comfort since objects have not to be held in a hand of the passengers during travel which, in turn, provides a greater freedom with respect to hand-related activities to the passenger.

In another embodiment, the room divider comprises at least one means for wireless charging and/or wireless communication. Wireless charging can e.g. be conducted inductively. The room divider can e.g. comprise means for generating an alternating electromagnetic field, in particular a winding structure or a coil. Said means for wireless charging and/or communication can be arranged within the aforementioned inner volume of the room divider. As in the case of a display, power and/or data cables to operate the means for wireless charging and/or communication can be guided through the stand into the inner volume and connected to the means for wireless charging, in particular to the winding structure, and/or to the means for wireless communication.

The means for wireless charging can be arranged at a predetermined height. It is, for instance, possible, that a geometric center of the means for wireless charging, e.g. geometric center of the winding structure, is located at a predetermined height with respect to the aforementioned coordinate system. As chargeable devices such as the previously described mobile devices, in particular tablets and/or mobile phones, are usually carried in pockets of the passengers' clothing or bags of the passengers, the predetermined height of arrangement of the means for wireless charging should be adapted to the average height of the pockets or a carrying height of the bags. It is possible to arrange the means for wireless charging at a height from an interval from 0.7 m to a height of 1.5 m.

Means for a wireless communication, e.g. an antenna structure, can be integrated into the room divider in the same way. Such means for wireless communication can e.g. be provided as a WLAN hotspot. This again enhances a travel comfort since a wireless communication of the passengers is improved This advantageously allows easily integrating means for for wireless charging and/or communication which further increases a travel comfort since power consuming devices which the passenger carry will not run out of power during travel and/or wireless communication is enhanced.

In another embodiment, the support surface is a surface of a charging pad of the room divider. A charging pad comprises an upper surface and at least one winding structure for generating an alternating electromagnetic field. As the support surface is facing upward, the winding structure can be arranged below the support surface.

Since a distance and/or an orientation of a chargeable device from/to the winding structure determines the quality of inductive charging, such a charging pad can improve the process of wireless charging. If a passenger places a chargeable mobile device, e.g. a tablet or a mobile phone, on the support surface, an optimal distance and/or an optimal orientation of the chargeable device to the winding structure can be provided.

This further improves the travel comfort of the passengers.

In another embodiment, the room divider comprises at least one perch seat or forms at least one perch seat. A seating area of the perch seat can be arranged at a bottom side or in a lower part of the room divider. The seating area of the perch seat can be a sub-part of the backrest surface or can extend from the backrest surface. In particular, the seating area can extend from the backrest surface towards the floor with a predetermined angular orientation with respect to the backrest surface.

The seating area of the perch seat can be slanted. This means that the seating area of the perch seat encloses a predetermined angle with the backrest surface. The angle is preferably larger than 90 degree, in particular larger than 135 degree. Thus, the perch seat does not provide a seating area which is parallel or nearly parallel to a plane comprising the floor of the passenger cabin.

It is, for example possible, that a width of a lateral cross-section of the room divider increases towards a bottom side of the backrest portion of the room divider which provides the backrest surface. The lateral cross-section denotes a cross-section within a plane perpendicular to the longitudinal axis. A width of the room divider can increase e.g. linearly in said lateral cross-section towards a bottom side of the backrest portion.

Such a perch seat further enhances the travel comfort of a passenger since the legs of the passenger can be partially relieved if the passenger leans against the backrest surface and the seating area of the perch seat.

In another embodiment, in particular in an alternative embodiment, the room divider comprises a tip-up seat. It is for instance possible that the room divider comprises rotation means by which a seat portion of the tip-up seat can be rotated about an axis which is parallel to the longitudinal axis. Furthermore, it is possible that the tip-up seat can be swung open which means that the seat part which provides a seating surface is moved away from the backrest portion of the room divider. It is also possible that the room divider comprises returning means, e.g. a torsion spring, by which said seat part is forced back towards the backrest portion. In an unused state, the moveable seat part of the tip-up seat, especially the seating area, can rest against or face a part of the backrest surface.

In another, in particular another alternative, embodiment, the room divider comprises or forms a fixed longitudinal seat. In this case, the room divider provides or forms an immoveable seating area, wherein the seating area can enclose a predetermined angle with the backrest surface, in particular an angle of 90 degree. It is possible that a seat structure which provides the aforementioned seating area is attached to the room divider, in particular mechanically fixed to the room divider.

This advantageously further increases the travel comfort since it allows a passenger to sit on the fixed longitudinal seat with his/her back placed against the backrest surface of the room divider.

In another, in particular in another alternative, embodiment, the room divider comprises a cellular seating arrangement. In this case, seats of the seating arrangement are arranged along a sub-part of a semi-circle or in a bay-layout.

This advantageously adds comfort by breaking up the interior space of a cabin so that passengers in the cabin are not directly staring at one another across the cabin. In particular, this enhances a privacy of the passengers. Another advantage is that passengers who are sitting on adjacent seats of the cellular seating arrangement can talk more easily and privately.

In another embodiment, the room divider is arranged in a saloon coach of a rail vehicle. In particular, the saloon coach allows transporting a high number of passengers.

This advantageously allows increasing the travel comfort during travelling in a saloon coach of a rail vehicle.

It is, of course possible to apply the proposed invention to any kind of vehicle for passenger transport, in particular to buses or automobiles, but also to aircraft vehicles.

Further proposed is a method of manufacturing a passenger cabin of a vehicle, in particular a saloon coach of a rail vehicle, comprising the steps of providing at least one passenger cabin frame, providing at least one room divider according to one of the previously described embodiments and attaching the room divider to the cabin frame of the passenger cabin such that at least a section of the backrest surface extends along a longitudinal axis of the passenger cabin.

This advantageously provides a method of manufacturing a passenger cabin, wherein a travel comfort for passengers using said passenger cabin is improved.

Also described is a vehicle, in particular a rail vehicle, wherein the vehicle comprises a passenger cabin according to one of the previously described embodiments.

BRIEF DESCRIPTION OF THE DRAWINGS

The invention will be described with reference to the following figures. The Figures show.

DETAILED DESCRIPTION OF THE INVENTION

Figure 1:
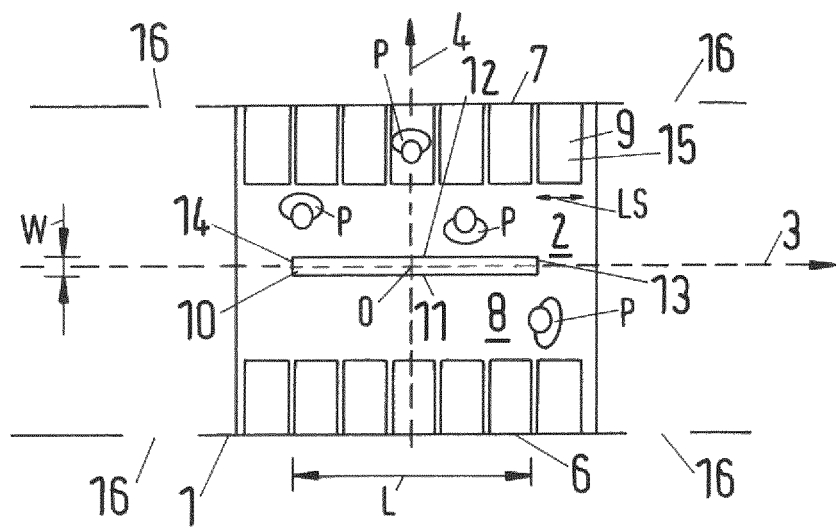
FIG. 1 a top view on a passenger cabin,
FIG. 2 a top view on another passenger cabin,
FIG. 3 a top view on another passenger cabin and
FIG. 4 a perspective view on a room divider.

FIG. 1 shows a top view on a passenger cabin 1 of a rail vehicle. The passenger cabin 1 can also be referred to as saloon coach. Shown is a floor 2 of the passenger cabin 1. A longitudinal axis is symbolized by a dashed line 3. A lateral axis is symbolized by another dashed line 4. An origin O of a coordinate system provided by the longitudinal axis 3, the lateral axis 4 and a vertical axis S (see FIG. 4) is denoted by the reference numeral O. A longitudinal direction is indicated by an arrowhead of the longitudinal axis 3. A lateral direction is indicated by an arrowhead of the lateral axis 4. A vertical direction points from the plane of projection towards an observer. The passenger cabin 1 has a right sidewall 6 and a left sidewall 7. The sidewalls 6, 7 enclose a standing room 8. Attached to the sidewalls 6, 7 are fixed longitudinal seats 9, wherein only one seat 9 is referenced for illustration purposes. Shown are also passengers P, wherein three passengers P are standees and one passenger P is seated on a longitudinal seat 9.

A room divider 10 is attached to the floor 2 of the passenger cabin 1. It is shown that the room divider 10 is centered in the passenger cabin 1. The room divider 10 has a right backrest surface 11 and a left backrest surface 12, wherein the right backrest surface 11 faces the right sidewall 6 and the left backrest surface 12 faces the left sidewall 7. Also shown is that the room divider 10 has a front surface 13 and a rear surface 14. The backrest surfaces 11, 12 extend in the longitudinal direction, i.e. along the longitudinal axis 3, of the passenger cabin 1. This means that normal vectors of the backrest surfaces 11, 12 are oriented parallel to the lateral axis 4. The room divider 10 has a length L and a width W. The length L is larger than the width W. In particular, the length L of the room divider 10 determines a length L of the backrest surfaces 11, 12 and is chosen such that more than two passengers P can lean against each backrest surface 11, 12 at the same time. A length LS of a seating area 15 of a longitudinal seat 9 is smaller than the length L of the room divider 10. In particular, the length L of the room divider 10 can be larger than 5 times the length LS of the seating area 15 of a longitudinal seat 9. This means that five passengers P can simultaneously lean against each of the backrest surfaces 11, 12.

Also shown are door openings 16 within the sidewalls 6, 7 of the passenger cabin 1. It is shown that the room divider 10 is centered in the longitudinal direction between two neighboring door openings 16.

Figure 2:
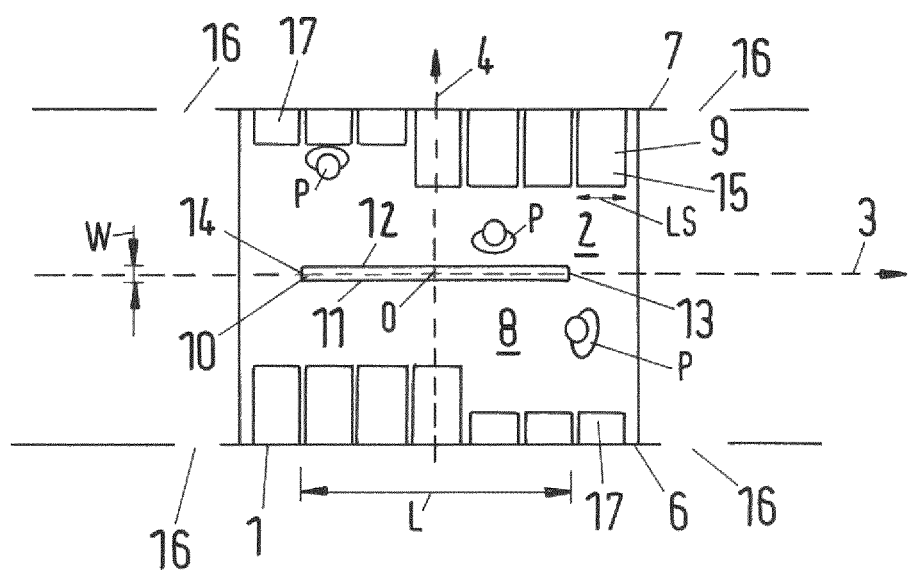

FIG. 2 shows a top view on another passenger cabin 1. In contrast to the passenger cabin 1 shown in FIG. 1, the passenger cabin 1 in FIG. 2 comprises fixed longitudinal seats 9 and tip-up seats 17 which are also attached to the sidewalls 6, 7 of the passenger cabin. This shows that the proposed room divider 10 can be used in passenger cabins 1 or saloon coaches with fixed longitudinal seats 9 and tip-up seats 17.

As will be explained later, fixed longitudinal seats and/or tip-up seats like the fixed longitudinal seats 9 and the tip-up seats 17 shown in FIG. 2 can also be attached to the room divider 10, in particular to the backrest surfaces 11, 12, respectively.

Figure 3:
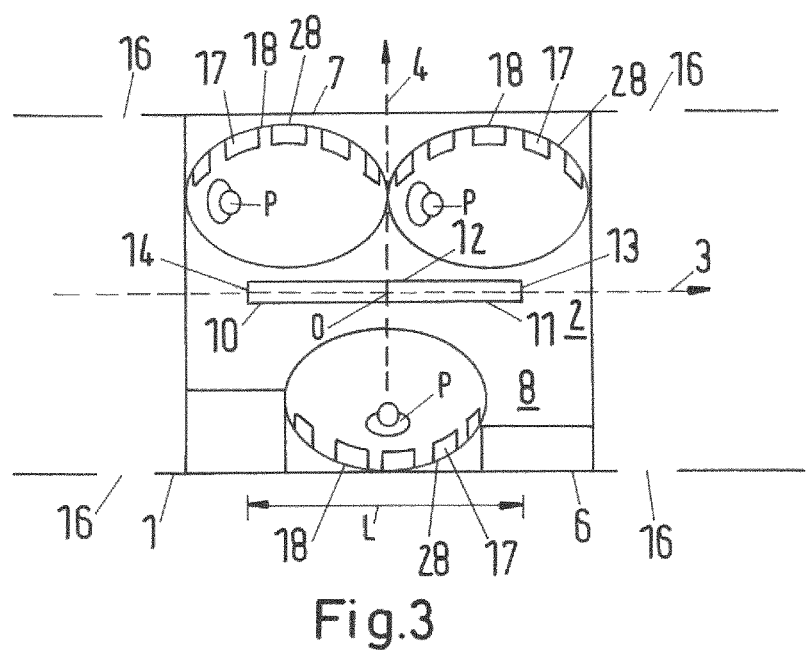

FIG. 3 shows a top view on another passenger cabin 1 comprising a standing room 8 and a floor 2. In contrast to the passenger cabins 1 shown in FIG. 1 and FIG. 2, the passenger cabin 1 comprises tip-up seats 17 arranged in a cellular seating arrangement 18. The cellular seating arrangements 18 are arranged next to the sidewalls 6, 7 of the passenger cabin 1. It can be seen that the tip-up seats 17 are attached to a supporting wall 28 which extends along a semi-circular path or a semi-oval path. All cellular seating arrangements 18 are opened towards a center of the passenger cabin 1. It is also possible that the cellular seating arrangement 18 can be attached to the room divider 10, in particular to the backrest surfaces 11, 12, respectively. In this case, the backrest surfaces 11, 12 can be surfaces of the supporting wall 28. In other words, the room divider 10 can be designed as a cellular seating arrangement 18.

Figure 4:
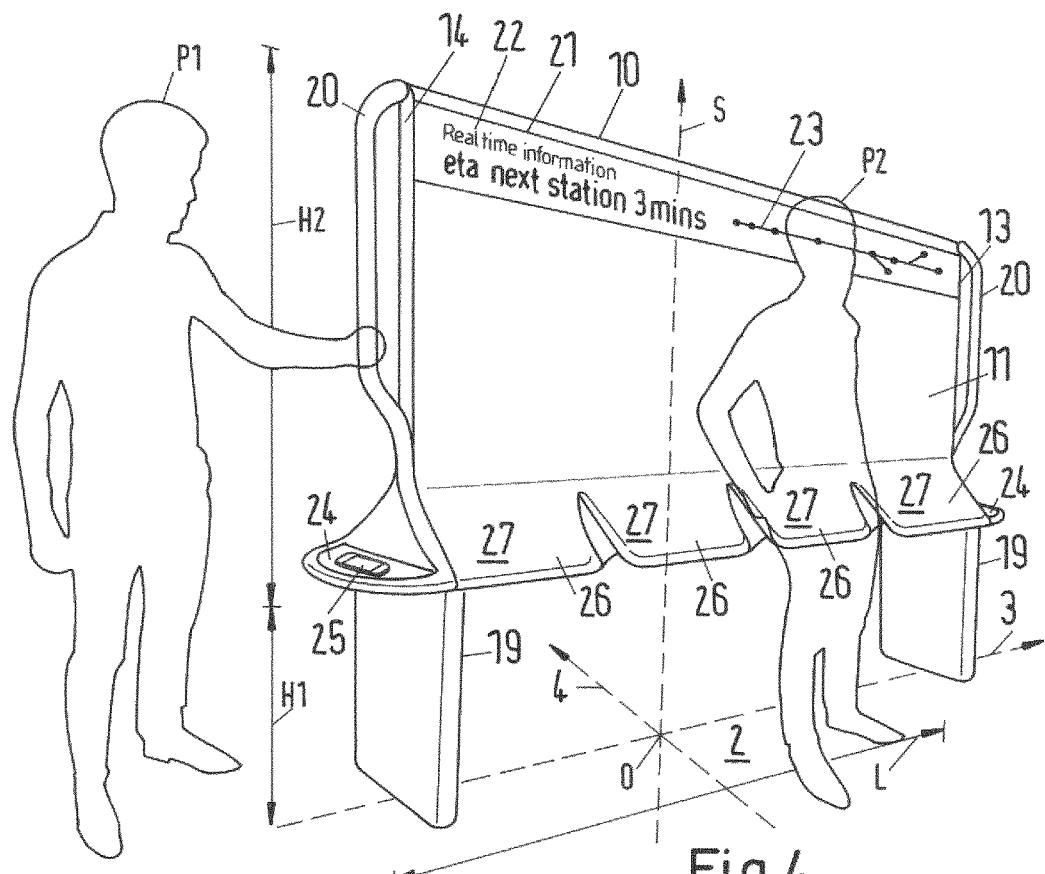

FIG. 4 shows a perspective view of a room divider 10. The room divider 10 comprises two backrest surfaces 11, wherein only one backrest surface 11 is visible in FIG. 4. The backrest surface 11 extends in the longitudinal direction (i.e. along the longitudinal axis 3) of the passenger cabin 1 (see FIG. 1). The room divider 10 and also the backrest surfaces 11 have a length L in the longitudinal direction. The room divider 10 comprises two stands 19, wherein the stands 19 are attached to the floor 2 of the passenger cabin 1. The stands 19 have a height H1 in the vertical direction along the vertical axis S. The vertical direction is indicated by an arrowhead of the vertical axis S. The backrest surfaces 11 have a height H2. The total height of the room divider 10 is thus given by the sum of the height H1 of the stands 19 and the height H2 of the backrest surfaces 11. The room divider 10 shown in FIG. 4 comprises two handle bars 20 which are attached to the front wall 13 and the rear wall 14 of the room divider 10, respectively. It is shown that both ends of each handle bar 20 are attached to the front and rear wall 13, 14, respectively. Also shown is that the room divider 10 comprises a display 21 which is provided in an upper portion of the backrest surfaces 11. The display 21 provides real time information 22 and static information 23 such as a route map. The surface material of the display 21 or a transparent cover material of the display 21 is chosen such that it withstands impacts and/or forces and/or wear while passengers P1, P2 are leaning, touching or affecting against/on the display 21. In FIG. 4 it is shown that the display 21 covers approximately a quarter of the total backrest surface 11. Along the vertical axis S, the display 21 extends from a predetermined height, e.g. 1.7 m to the total height of the room divider 10. Along the longitudinal axis 3, the display 21 extends along the whole length L of the room divider 10.

Also shown is that the room divider 10 provides two support surfaces 24 which are surfaces of charging pads of the room divider 10. With respect to the vertical direction, a winding structure (not shown) is located under the support surfaces 24. The winding structure can generate an alternating electromagnetic field for inductive power transfer to e.g. a mobile phone 25 placed on the support surface. Power cables (not shown) can be guided from below the floor 2 trough the stands 19 into an inner volume of the room divider 10 and to the winding structure. The winding structure is therefore located at a height which is approximately equal to the height H1 of the stands. This height corresponds to a standard height of trouser pockets of passengers P1, P2. Thus, not only devices placed on the support surface 24 can be charged by inductive power transfer but also mobile devices carried within pockets of the passengers P1, P2.

In FIG. 4, it is also shown that the room divider 10 provides four perch seats 26. The perch seats 26 are provided at a lower end of the backrest surfaces 11 and extend from said lower end. Each perch seat has a seating area 27, wherein a surface of the seating area 27 encloses an angle with the backrest surface 11 or with a longitudinal plane which is defined by the longitudinal and the vertical axis 3, S. The angle can be chosen from an interval from 120 degree to 150 degree. It is shown that a second passenger P2 leans his back against the backrest surface 11 while he sits at the same time on the seating area 27 of the perch seat 26.

Thus, the perch seats 26 are provided by an increasing width W of the room divider 10 in a lateral cross-section towards a lower end of the backrest surface 11. The lateral cross-section is defined by a section-plane perpendicular to the longitudinal axis 3.

The invention claimed is:

1. A passenger cabin of a vehicle, comprising: a room divider, wherein the room divider is attached to a cabin frame, wherein the room divider comprises at least one backrest surface,
   wherein at least a section of the backrest surface extends along a longitudinal axis of the passenger cabin, and wherein the room divider comprises at least one perch seat or forms at least one perch seat, and
   wherein a seating area of the at least one perch seat is fixed relative to the backrest surface, and
   wherein the seating area of the at least one perch seat encloses an angle in a range of 120° to 150° relative to the backrest surface.

2. The passenger cabin according to claim 1, wherein the room divider is centered in the passenger cabin.

3. The passenger cabin according to claim 1, wherein a length of the room divider or backrest surface along the longitudinal axis is chosen such that more than one passenger can lean against the backrest surface.

4. The passenger cabin according to claim 1, wherein the room divider comprises at least one stand, wherein the stand is attached to the floor of the passenger cabin.

5. The passenger cabin according to claim 1, wherein the room divider comprises a hand hold.

6. The passenger cabin according to claim 1, wherein the room divider comprises a display.

7. The passenger cabin according to claim 1, wherein the room divider comprises or forms at least one support surface, wherein the support surface is oriented parallel to a floor surface of the passenger cabin.

8. The passenger cabin according to claim 1, wherein the room divider comprises at least one charging pad for wireless charging and/or communication.

9. The passenger cabin according to claim 8, wherein the support surface is a surface of a charging pad of the room divider.

10. The passenger cabin according to claim 1, wherein the room divider comprises a tip up seat.

11. The passenger cabin according to claim 1, wherein the room divider comprises or forms a fixed longitudinal seat.

12. The passenger cabin according to claim 1, wherein the room divider comprises or forms a cellular seating arrangement.

13. The passenger cabin according to claim 1, wherein the room divider is arranged in a saloon coach of a rail vehicle.

14. A method of manufacturing a passenger cabin of a vehicle, in particular of a rail vehicle, comprising the steps of
   providing at least one passenger cabin frame,
   providing at least one room divider according to claim 1,
   attaching the room divider to the frame of the passenger cabin such that at least a section of the backrest surface extends along a longitudinal axis of the passenger cabin.

* * * * *